United States Patent
Abusleme et al.

(10) Patent No.: US 11,088,419 B2
(45) Date of Patent: Aug. 10, 2021

(54) FLUOROPOLYMER MEMBRANE FOR ELECTROCHEMICAL DEVICES

(71) Applicants: SOLVAY SA, Brussels (BE); COMMISSARIAT A L' ENERGIE ATOMIQUE ET AUX ENERGIES ALTERNATIVES, Paris (FR)

(72) Inventors: Julio A. Abusleme, Saronno (IT); Marc-David Braida, Bry-sur-Marne (FR); Christine Hamon, Bollate (IT); Hélène Rouault, Le Versoud (FR); Djamel Mourzagh, Sassenage (FR); Gaëlle Besnard, Grenoble (FR); Daniel Tomasi, Villard Saint Christophe (FR)

(73) Assignees: Commissariat à L'énergie Atomique et aux énergies Alternatives, Paris (FR); Solvay SA, Brussels (BE)

( * ) Notice: Subject to any disclaimer, the term of this patent is extended or adjusted under 35 U.S.C. 154(b) by 175 days.

(21) Appl. No.: 16/310,412

(22) PCT Filed: Jun. 13, 2017

(86) PCT No.: PCT/EP2017/064447
§ 371 (c)(1),
(2) Date: Dec. 14, 2018

(87) PCT Pub. No.: WO2017/216185
PCT Pub. Date: Dec. 21, 2017

(65) Prior Publication Data
US 2019/0252657 A1     Aug. 15, 2019

(30) Foreign Application Priority Data
Jun. 14, 2016  (EP) .................................... 16305722

(51) Int. Cl.
| | | |
|---|---|---|
| *H01M 2/16* | (2006.01) | |
| *H01M 50/403* | (2021.01) | |
| *H01M 10/0525* | (2010.01) | |
| *B01D 69/14* | (2006.01) | |
| *B01D 71/32* | (2006.01) | |
| *C08J 5/22* | (2006.01) | |
| *H01M 50/446* | (2021.01) | |
| *C08F 14/22* | (2006.01) | |
| *C08F 20/06* | (2006.01) | |
| *H01M 4/66* | (2006.01) | |
| *C08F 214/22* | (2006.01) | |
| *B01D 67/00* | (2006.01) | |
| *H01M 4/02* | (2006.01) | |

(52) U.S. Cl.
CPC ........ *H01M 50/403* (2021.01); *B01D 69/148* (2013.01); *B01D 71/32* (2013.01); *C08F 14/22* (2013.01); *C08F 20/06* (2013.01); *C08J 5/225* (2013.01); *H01M 4/668* (2013.01); *H01M 10/0525* (2013.01); *H01M 50/446* (2021.01); *B01D 67/0079* (2013.01); *C08F 214/225* (2013.01); *C08J 2327/16* (2013.01); *H01M 2004/028* (2013.01); *H01M 2004/029* (2013.01)

(58) Field of Classification Search
CPC .......... H01M 10/0525; H01M 10/056; H01M 4/668; H01M 4/623; H01M 2/166; B01D 67/0079; B01D 69/148
See application file for complete search history.

(56) References Cited

U.S. PATENT DOCUMENTS

| | | | |
|---|---|---|---|
| 6,203,944 B1 | 3/2001 | Turner et al. | |
| 9,607,778 B2 * | 3/2017 | Gadkaree | ............... H01G 11/50 |
| 10,030,112 B2 * | 7/2018 | Ducros | ............ H01M 10/0565 |
| 2014/0315080 A1 | 10/2014 | Abusleme et al. | |
| 2015/0194271 A1 | 7/2015 | Toniolo et al. | |
| 2015/0287989 A1 * | 10/2015 | Hirose | ................ H01M 4/5825 429/217 |
| 2019/0131617 A1 * | 5/2019 | Ahn | ....................... H01M 4/628 |

FOREIGN PATENT DOCUMENTS

| | | |
|---|---|---|
| WO | 0003444 A1 | 1/2000 |
| WO | 2015022229 A1 | 2/2015 |
| WO | 2015169834 A1 | 11/2015 |

OTHER PUBLICATIONS

Terborg, L. et al.: "Investigation of thermal aging and hydrolysis mechanisms in commercial lithium ion battery electrolyte", Journal of Power Sources., 2013, vol. 242, pp. 832-837—Elsevier B.V.
Kraemer, L. et al.: "Mechanism of Anodic Dissolution of the Aluminum Current Collector in 1 M LiTFSI EC:DEC 3:7 in Rechargeable Lithium Batteries", J. Electrochem. Soc., 2013, vol. 160, No. 2, pp. A356-A360.
Rothermel , S. et al.: "Dual-graphite cells based on the reversible intercalation of bis(trifluoromethanesulfonyl)imide anions from an ionic liquid electrolyte", Energy & Environmental Science, 2014, vol. 7, pp. 3412-3423—The Royal Society of Chemistry.

* cited by examiner

*Primary Examiner* — Amanda C. Walke
(74) *Attorney, Agent, or Firm* — Osha Bergman Watanabe & Burton LLP

(57) ABSTRACT

The present invention pertains to a membrane for an electrochemical device, to a process for manufacturing said membrane and to use of said membrane in a process for manufacturing an electrochemical device.

4 Claims, No Drawings

FLUOROPOLYMER MEMBRANE FOR ELECTROCHEMICAL DEVICES

This application is a U.S. national stage entry under 35 U.S.C. 071 of International Application No. PCT/EP2017/064447 filed Jun. 13, 2017, which claims priority to European application No. EP 16305722.7 filed on Jun. 14, 2016. The entire contents of these applications are explicitly incorporated herein by this reference.

TECHNICAL FIELD

The present invention pertains to a membrane for an electrochemical device, to a process for manufacturing said membrane and to use of said membrane in a process for manufacturing an electrochemical device.

BACKGROUND ART

Fluoropolymers and, in particular, vinylidene fluoride polymers are used in a wide variety of applications including electrochemical applications.

For instance, fluoropolymers are advantageously used as raw materials in the manufacture of either electrodes or membranes suitable for use in electrochemical devices such as secondary batteries because of their chemical and thermal aging resistance.

Alkaline or alkaline-earth secondary batteries are typically formed by assembling a positive electrode (cathode), a ion conducting membrane and a negative electrode (anode). The ion conducting membrane, often referred to as separator, plays a crucial role in the battery as it must provide for a high ionic conductivity while ensuring effective separation between the opposite electrodes.

Electrolytes suitable for use in electrochemical devices such as secondary batteries typically include liquid electrolytes and solid electrolytes. In order for electrolytes to be suitable for use in secondary batteries, they should exhibit high ionic conductivity, high chemical and electrochemical stability toward the electrodes and high thermal stability over a wide range of temperatures.

Liquid electrolytes suitable for use in Lithium-ion secondary batteries typically comprise metal salts such as Lithium salts dissolved in proper organic solvents.

However, critical safety issues may arise from overheating when a liquid electrolyte is heated above its flash point. In particular, thermal runaway may occur at high temperatures through chemical reaction of oxygen released by the cathode material with the organic liquid electrolyte as fuel.

In order to solve safety issues in Lithium-ion secondary batteries, gel polymer electrolytes have been studied which advantageously combine the advantages of both liquid electrolytes and solid polymer electrolytes thus being endowed with high ionic conductivity and high thermal stability.

Also, certain metal salts may degrade during the process for manufacturing secondary batteries or may corrode the collector of either the electrodes of such secondary batteries.

In particular, LiTFSI has been widely used as stable electrolyte salt as compared to LiPF$_6$, which easily undergoes hydrolysis. See for instance, TERBORG, L., et al. Investigation of thermal aging and hydrolysis mechanisms in commercial lithium ion battery electrolyte. *Journal of Power Sources*. 2013, vol. 242, p. 832-837.

Unfortunately, an electrolyte medium containing LiTFSI dissolved in organic carbonates, in the presence of high voltage active materials for the cathode in Lithium-ion secondary batteries, tends to corrode the aluminium collector of the cathode. See, for instance, KRAEMER, L., et al. Mechanism of Anodic Dissolution of the Aluminum Current Collector in 1 M LiTFSI EC:DEC 3:7 in Rechargeable Lithium Batteries. *J. Electrochem. Soc.* 2013, vol. 160, no. 2, p. A356-360.

Also, an electrolyte medium containing LiTFSI dissolved in ionic liquids, instead of organic carbonates, tends to exfoliate a graphite-based anode for a Lithium-ion secondary battery. See, for instance, ROTHERMEL, S., et al. Dual-graphite cells based on the reversible intercalation of bis(trifluoromethanesulfonyl)imide anions from an ionic liquid electrolyte. *Energy & Environmental Science*. 2014, vol. 7, p. 3412-3423.

It has been thus found that use of an electrolyte medium containing LiTFSI dissolved either in organic carbonates or in ionic liquids does not properly ensure manufacturing safe secondary batteries where a high voltage cathode is associated to a graphite-based anode.

There is thus still the need in the art for membranes suitable for use in electrochemical devices, in particular in secondary batteries such as Lithium-ion batteries, said electrochemical devices exhibit outstanding capacity values while properly ensuring safety requirements.

SUMMARY OF INVENTION

It has been now surprisingly found that an electrochemical device, especially a secondary battery, can be easily manufactured by using the membrane of the invention.

It has been also surprisingly found that the membrane of the invention complies with safety requirements and does not suffer the deficiencies of the membranes known in the art.

In particular, the membrane of the invention enables successfully manufacturing electrochemical devices, especially secondary batteries such as Lithium-ion secondary batteries, by avoiding degradation of the metal salts, while ensuring good electrochemical performances and, according to certain embodiments, also good mechanical flexibility of said electrochemical devices.

In a first instance, the present invention pertains to a membrane for an electrochemical device, said membrane comprising, preferably consisting of:
  at least one fluoropolymer hybrid organic/inorganic composite [polymer (F-h)], and
  a liquid medium [medium (L)] comprising at least one organic carbonate and LiPF$_6$.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

In a second instance, the present invention pertains to a process for the manufacture of a membrane for an electrochemical device.

According to a first preferred embodiment of the invention, the process for the manufacture of a membrane for an electrochemical device typically comprises hydrolysing and/or condensing a composition comprising, preferably consisting of:
  at least one fluoropolymer [polymer (F)],
  at least one metal compound [compound (M1)] of formula (I):

$$X_{4-m}AY_m \quad \text{(I)}$$

wherein m is an integer from 1 to 4, A is a metal selected from the group consisting of Si, Ti and Zr, Y is a hydrolysable group and X is a hydrocarbon group, optionally comprising one or more functional groups, and a liquid medium [medium (L)] comprising at least one organic carbonate and LiPF$_6$.

The membrane for an electrochemical device of the invention is advantageously obtainable by the process according to this first preferred embodiment of the invention.

The selection of the hydrolysable group Y of the compound (M1) of formula (I) as defined above is not particularly limited provided that it enables under appropriate conditions the formation of a —O-AE bond. The hydrolysable group Y of the compound (M1) of formula (I) as defined above is typically selected from the group consisting of halogen atoms, preferably being a chlorine atom, hydrocarboxy groups, acyloxy groups and hydroxyl groups.

In case the compound (M1) of formula (I) as defined above comprises at least one functional group on group X, it will be designated as functional compound (M1); in case none of groups X of the compound (M1) of formula (I) as defined above comprise a functional group, the compound (M1) of formula (I) as defined above will be designated as non-functional compound (M1).

The compound (M1) is preferably of formula (I-A):

$$R^A_{4-m}A(OR^B)_m \quad \text{(I-A)}$$

wherein m is an integer from 1 to 4, and, according to certain embodiments, from 1 to 3, A is a metal selected from the group consisting of Si, Ti and Zr, $R^A$ and $R^B$, equal to or different from each other and at each occurrence, are independently selected from $C_1$-$C_{18}$ hydrocarbon groups, wherein $R^A$ optionally comprises at least one functional group.

Non-limiting examples of functional groups include, notably, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M1) of formula (I) as defined above be a functional compound (M1), it is more preferably of formula (I-B):

$$R^{A'}_{4-m}A(OR^{B'})_m \quad \text{(I-B)}$$

wherein m is an integer from 1 to 3, A is a metal selected from the group consisting of Si, Ti and Zr, $R^{A'}$, equal to or different from each other and at each occurrence, is a $C_1$-$C_{12}$ hydrocarbon group comprising at least one functional group and $R^{B'}$, equal to or different from each other and at each occurrence, is a $C_1$-$C_5$ linear or branched alkyl group, preferably $R^{B'}$ being a methyl or ethyl group.

Examples of functional compounds (M1) are notably vinyltriethoxysilane, vinyltrimethoxysilane, vinyltrismethoxyethoxysilane of formula CH$_2$=CHSi(OC$_2$H$_4$OCH$_3$)$_3$, 2-(3,4-epoxycyclohexylethyltrimethoxysilane) of formula:

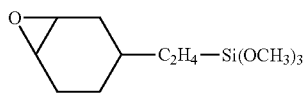

glycidoxypropylmethyldiethoxysilane of formula:

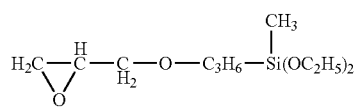

glycidoxypropyltrimethoxysilane of formula:

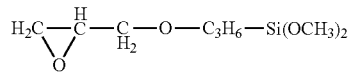

methacryloxypropyltrimethoxysilane of formula:

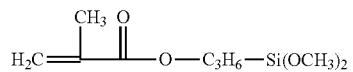

aminoethylaminpropylmethyldimethoxysilane of formula:

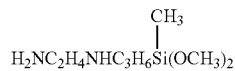

aminoethylaminpropyltrimethoxysilane of formula:

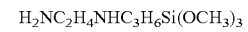

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-am inopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

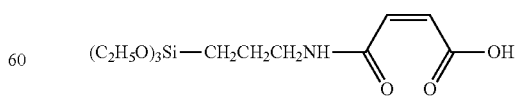

3-(trihydroxysilyl)-1-propane-sulphonic acid of formula HOSO$_2$—CH$_2$CH$_2$CH$_2$—Si(OH)$_3$, N-(trimethoxysilylpropyl)ethylene-diamine triacetic acid, and its sodium salts, 3-(triethoxysilyl)propylsuccinic anhydride of formula:

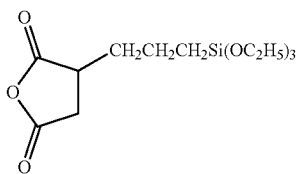

acetamidopropyltrimethoxysilane of formula $H_3C\text{—}C(O)NH\text{—}CH_2CH_2CH_2\text{—}Si(OCH_3)_3$, alkanolamine titanates of formula $Ti(L)_x(OR)_y$, wherein L is an amine-substituted alkoxy group, e.g. $OCH_2CH_2NH_2$, R is an alkyl group, and x and y are integers such that x+y=4.

Examples of non-functional compounds (M1) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

According to a second preferred embodiment of the invention, the process for the manufacture of a membrane for an electrochemical device typically comprises hydrolysing and/or condensing a composition comprising, preferably consisting of:
- at least one functional fluoropolymer [functional polymer (F)] comprising recurring units derived from at least one functional hydrogenated monomer comprising at least one hydroxyl end group,
- at least one metal compound [compound (M2)] of formula (II):

wherein m' is an integer from 1 to 3, A' is a metal selected from the group consisting of Si, Ti and Zr, Y' is a hydrolysable group and X' is a hydrocarbon group comprising at least one —N=C=O functional group,
- optionally, at least one metal compound [compound (M1)] of formula (I) as defined above, and
- a liquid medium [medium (L)] comprising at least one organic carbonate and $LiPF_6$.

The membrane for an electrochemical device of the invention is advantageously obtainable by the process according to this second preferred embodiment of the invention.

The selection of the hydrolysable group Y' of the compound (M2) of formula (II) as defined above is not particularly limited provided that it enables under appropriate conditions the formation of a —O-AE bond. The hydrolysable group Y' of the compound (M2) of formula (II) as defined above is typically selected from the group consisting of halogen atoms, preferably being a chlorine atom, hydrocarboxy groups, acyloxy groups and hydroxyl groups.

The compound (M2) is preferably of formula (II-A):

wherein m' is an integer from 1 to 3, A' is a metal selected from the group consisting of Si, Ti and Zr, $R^C$, equal to or different from each other and at each occurrence, is a $C_1$-$C_{12}$ hydrocarbon group comprising at least one —N=C=O functional group and $R^D$, equal to or different from each other and at each occurrence, is a $C_1$-$C_5$ linear or branched alkyl group, preferably $R^D$ being a methyl or ethyl group.

The compound (M2) is more preferably of formula (II-B):

wherein A' is a metal selected from the group consisting of Si, Ti and Zr, R C', equal to or different from each other and at each occurrence, is a linear or branched $C_1$-$C_{12}$ hydrocarbon group and $R^{D'}$, equal to or different from each other and at each occurrence, is a $C_1$-$C_5$ linear or branched alkyl group, preferably $R^{D'}$ being a methyl or ethyl group.

Non-limiting examples of suitable compounds (M2) include the followings: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

Should the compound (M1) of formula (I) as defined above in the membrane according to this second embodiment of the invention be a functional compound (M1), it typically comprises at least one functional group different from the —N=C=O functional group.

The fluoropolymer hybrid organic/inorganic composite [polymer (F-h)] typically comprises, preferably consists of, fluoropolymer domains and inorganic domains, wherein the inorganic domains are obtainable by hydrolysing and/or condensing at least one pendant side chain comprising an end group of formula —O—C(O)—NH—Z-AY$_m$X$_{3-m}$ (M1-g), wherein m, Y, A, X have the same meaning as defined above and Z is a hydrocarbon group, optionally comprising at least one functional group, optionally, at least one pendant side chain comprising an end groups of formula —O-A'Y'$_{m'-1}$X'$_{4-m'}$(M2-g), wherein m', Y', A', X' have the same meaning as defined above.

The membrane of the invention is particularly suitable for use in electrochemical devices, in particular in secondary batteries.

For the purpose of the present invention, the term "secondary battery" is intended to denote a rechargeable battery.

The secondary battery of the invention is preferably a secondary battery based on any of Lithium (Li), Sodium (Na), Potassium (K), Magnesium (Mg), Calcium (Ca), Zinc (Zn) and Yttrium (Y).

The secondary battery of the invention is more preferably a Lithium-ion secondary battery.

In a third instance, the present invention pertains to a process for the manufacture of an electrochemical device, preferably a secondary battery, said process comprising assembling at least one membrane of the invention between a positive electrode [positive electrode (E)] and a negative electrode [negative electrode (E)], wherein at least one of the positive electrode (E) and the negative electrode (E) comprises:
- a current collector, and
- adhered to said current collector, at least one fluoropolymer layer comprising, preferably consisting of:
  - at least one fluoropolymer [polymer (F)],
  - at least one electro-active compound [compound (EA)],
  - a liquid medium [medium (L)] comprising at least one metal salt [salt (M)], preferably $LiPF_6$,
  - optionally, at least one conductive compound [compound (C)], and
  - optionally, one or more additives.

In a fourth instance, the present invention pertains to an electrochemical device, preferably a secondary battery, comprising at least one membrane of the invention between a positive electrode (E) and a negative electrode (E), wherein at least one of the positive electrode (E) and the negative electrode (E) comprises:
a current collector, and
adhered to said current collector, at least one fluoropolymer layer comprising, preferably consisting of:
at least one fluoropolymer [polymer (F)],
at least one electro-active compound [compound (EA)],
a liquid medium [medium (L)] comprising at least one metal salt [salt (M)], preferably $LiPF_6$,
optionally, at least one conductive compound [compound (C)], and
optionally, one or more additives.

The polymer (F) typically comprises recurring units derived from at least one fluorinated monomer.

The polymer (F) is preferably a partially fluorinated fluoropolymer.

For the purpose of the present invention, the term "partially fluorinated fluoropolymer" is intended to denote a polymer comprising recurring units derived from at least one fluorinated monomer and, optionally, at least one hydrogenated monomer, wherein at least one of said fluorinated monomer and said hydrogenated monomer comprises at least one hydrogen atom.

By the term "fluorinated monomer" it is hereby intended to denote an ethylenically unsaturated monomer comprising at least one fluorine atom.

By the term "hydrogenated monomer" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) may be a functional fluoropolymer [functional polymer (F)].

The functional polymer (F) typically comprises recurring units derived from at least one fluorinated monomer and at least one functional hydrogenated monomer.

The polymer (F) is advantageously a linear polymer [polymer $(F_L)$] comprising linear sequences of recurring units derived from at least one fluorinated monomer and, optionally, at least one functional hydrogenated monomer.

The polymer (F) is thus typically distinguishable from graft polymers.

The functional polymer (F) is advantageously a random polymer [polymer $(F_R)$] comprising linear sequences of randomly distributed recurring units derived from at least one fluorinated monomer and at least one functional hydrogenated monomer.

The expression "randomly distributed recurring units" is intended to denote the percent ratio between the average number of sequences of at least one functional hydrogenated monomers (%), said sequences being comprised between two recurring units derived from at least one fluorinated monomer, and the total average number of recurring units derived from at least one functional hydrogenated monomer (%).

When each of the recurring units derived from at least one functional hydrogenated monomer is isolated, that is to say that a recurring unit derived from a functional hydrogenated monomer is comprised between two recurring units of at least one fluorinated monomer, the average number of sequences of at least one functional hydrogenated monomer equals the average total number of recurring units derived from at least one functional hydrogenated monomer, so that the fraction of randomly distributed recurring units derived from at least one functional hydrogenated monomer is 100%: this value corresponds to a perfectly random distribution of recurring units derived from at least one functional hydrogenated monomer. Thus, the larger is the number of isolated recurring units derived from at least one functional hydrogenated monomer with respect to the total number of recurring units derived from at least one functional hydrogenated monomer, the higher will be the percentage value of fraction of randomly distributed recurring units derived from at least one functional hydrogenated monomer.

The functional polymer (F) is thus typically distinguishable from block polymers.

According to a first embodiment of the invention, the polymer (F) may be a functional polymer (F) comprising recurring units derived from at least one fluorinated monomer, at least one functional hydrogenated monomer comprising at least one hydroxyl end group and, optionally, at least one hydrogenated monomer different from said functional hydrogenated monomer comprising at least one hydroxyl end group.

The functional polymer (F) according to this first embodiment of the invention is particularly suitable for use in the membrane obtainable by the process according to the second embodiment of the invention.

According to a second embodiment of the invention, the polymer (F) may be a functional polymer (F) comprising recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

The functional polymer (F) according to this second embodiment of the invention is particularly suitable for use in any of the positive electrode (E) and the negative electrode (E) of the electrochemical device of the invention.

The polymer (F) is typically obtainable by polymerization of at least one fluorinated monomer.

The functional polymer (F) is typically obtainable by polymerization of at least one fluorinated monomer and at least one functional hydrogenated monomer.

According to the first embodiment of the invention, the functional polymer (F) is typically obtainable by polymerization of at least one fluorinated monomer, at least one functional hydrogenated monomer comprising at least one hydroxyl end group and, optionally, at least one hydrogenated monomer different from said functional hydrogenated monomer comprising at least one hydroxyl end group.

According to the second embodiment of the invention, the functional polymer (F) is typically obtainable by polymerization of at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:
- $C_2$-$C_8$ perfluoroolefins such as tetrafluoroethylene and hexafluoropropylene;
- $C_2$-$C_8$ hydrogenated fluoroolefins such as vinylidene fluoride, vinyl fluoride, 1,2-difluoroethylene and trifluoroethylene;
- perfluoroalkylethylenes of formula $CH_2=CH-R_{f0}$ wherein $R_{f0}$ is a $C_1$-$C_6$ perfluoroalkyl;
- chloro- and/or bromo- and/or iodo-$C_2$-$C_6$ fluoroolefins such as chlorotrifluoroethylene;
- (per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;
- $CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;
- (per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;
- functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;
- fluorodioxoles, preferably perfluorodioxoles.

Should the fluorinated monomer be a hydrogen-containing fluorinated monomer such as, for instance, vinylidene fluoride, trifluoroethylene or vinyl fluoride, the polymer (F) is either a partially fluorinated fluoropolymer comprising recurring units derived from at least one hydrogen-containing fluorinated monomer, at least one functional hydrogenated monomer comprising at least one carboxylic acid end group and, optionally, at least one fluorinated monomer different from said hydrogen-containing fluorinated monomer or it is a partially fluorinated fluoropolymer comprising recurring units derived from at least one hydrogen-containing fluorinated monomer, at least one functional hydrogenated monomer comprising at least one carboxylic acid end group, optionally, at least one fluorinated monomer different from said hydrogen-containing fluorinated monomer and, optionally, at least one hydrogenated monomer different from said functional hydrogenated monomer comprising at least one carboxylic acid end group.

Should the fluorinated monomer be a per(halo)fluorinated monomer such as, for instance, tetrafluoroethylene, chlorotrifluoroethylene, hexafluoropropylene or a perfluoroalkylvinylether, the polymer (F) is a partially fluorinated fluoropolymer comprising recurring units derived from at least one per(halo)fluorinated monomer, at least one functional hydrogenated monomer comprising at least one carboxylic acid end group, at least one hydrogenated monomer different from said functional hydrogenated monomer comprising at least one carboxylic acid end group and, optionally, at least one fluorinated monomer different from said per(halo)fluorinated monomer.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (F) comprises preferably at least 0.01% by moles, more preferably at least 0.05% by moles, even more preferably at least 0.1% by moles of recurring units derived from at least one functional hydrogenated monomer.

The polymer (F) comprises preferably at most 20% by moles, more preferably at most 15% by moles, even more preferably at most 10% by moles, most preferably at most 3% by moles of recurring units derived from at least one functional hydrogenated monomer.

Determination of average mole percentage of recurring units derived from at least one functional hydrogenated monomer in the functional polymer (F) can be performed by any suitable method. Mention can be notably made of acid-base titration methods or NMR methods.

The functional polymer (F) is preferably a partially fluorinated fluoropolymer comprising recurring units derived from vinylidene fluoride (VDF), at least one functional hydrogenated monomer and, optionally, at least one fluorinated monomer different from VDF.

According to the first embodiment of the invention, the functional polymer (F) is preferably a partially fluorinated fluoropolymer comprising recurring units derived from vinylidene fluoride (VDF), at least one functional hydrogenated monomer comprising at least one hydroxyl end group and, optionally, at least one fluorinated monomer different from VDF.

The functional polymer (F) of this first embodiment of the invention more preferably comprises recurring units derived from:
- at least 60% by moles, preferably at least 75% by moles, more preferably at least 85% by moles of vinylidene fluoride (VDF),
- from 0.01% to 20% by moles, preferably from 0.05% to 15% by moles, more preferably from 0.1% to 10% by moles of at least one functional hydrogenated monomer comprising at least one hydroxyl end group, and
- optionally, from 0.1% to 15% by moles, preferably from 0.1% to 12% by moles, more preferably from 0.1% to 10% by moles of at least one fluorinated monomer selected from vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The functional hydrogenated monomer comprising at least one hydroxyl end group is preferably selected from the group consisting of (meth)acrylic monomers of formula (III) and vinylether monomers of formula (IV):

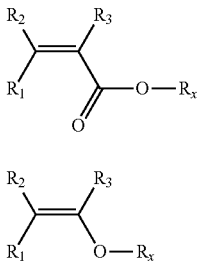

(III)

(IV)

wherein each of $R_1$, $R_2$ and $R_3$, equal to or different from each other, is independently a hydrogen atom or a $C_1$-$C_3$ hydrocarbon group, and $R_X$ is a $C_1$-$C_5$ hydrocarbon moiety comprising at least one hydroxyl group.

The functional hydrogenated monomer comprising at least one hydroxyl end group is more preferably of formula (III) as defined above.

The functional hydrogenated monomer comprising at least one hydroxyl end group is even more preferably of formula (III-A):

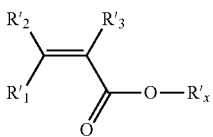

(III-A)

wherein $R'_1$, $R'_2$ and $R'_3$ are hydrogen atoms and $R'_x$ is a $C_1$-$C_5$ hydrocarbon moiety comprising at least one hydroxyl group.

Non-limiting examples of functional hydrogenated monomers comprising at least one hydroxyl end group include, notably, hydroxyethyl(meth)acrylate, hydroxypropyl(meth)acrylate, hydroxyethylhexyl(meth)acrylate.

The functional hydrogenated monomer comprising at least one hydroxyl end group is even more preferably selected from the followings:

hydroxyethyl acrylate (HEA) of formula:

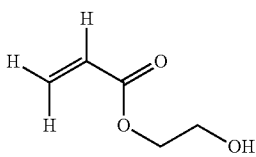

2-hydroxypropyl acrylate (HPA) of either of formulae:

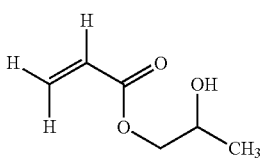

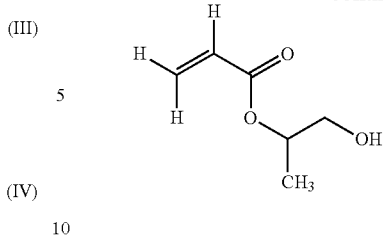

and mixtures thereof.

According to the second embodiment of the invention, the functional polymer (F) is preferably a partially fluorinated fluoropolymer comprising recurring units derived from vinylidene fluoride (VDF), at least one functional hydrogenated monomer comprising at least one carboxylic acid end group and, optionally, at least one fluorinated monomer different from VDF.

The functional polymer (F) of this second embodiment of the invention more preferably comprises recurring units derived from:
- at least 60% by moles, preferably at least 75% by moles, more preferably at least 85% by moles of vinylidene fluoride (VDF),
- from 0.01% to 20% by moles, preferably from 0.05% to 15% by moles, more preferably from 0.1% to 10% by moles of at least one functional hydrogenated monomer comprising at least one carboxylic acid end group, and
- optionally, from 0.1% to 15% by moles, preferably from 0.1% to 12% by moles, more preferably from 0.1% to 10% by moles of at least one fluorinated monomer selected from vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The functional hydrogenated monomer comprising at least one carboxylic acid end group is preferably selected from the group consisting of (meth)acrylic monomers of formula (V):

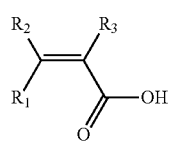

(V)

wherein each of $R_1$, $R_2$ and $R_3$, equal to or different from each other, is independently a hydrogen atom or a $C_1$-$C_3$ hydrocarbon group.

Non-limiting examples of functional hydrogenated monomers comprising at least one carboxylic acid end group include, notably, acrylic acid and methacrylic acid.

The polymer (F) is typically obtainable by emulsion polymerization or suspension polymerization.

For the purpose of the present invention, the term "electro-active compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release Lithium ions.

The nature of the compound (EA) of the layer (L1) of the electrode (E) of the invention depends on whether the electrode (E) thereby provided is a positive electrode [positive electrode (E)] or a negative electrode [negative electrode (E)].

In the case of forming a positive electrode (E) for a Lithium-ion secondary battery, the compound (EA) may comprise a composite metal chalcogenide of formula $LiMQ_2$, wherein M is at least one metal selected from transition metals such as Co, Ni, Fe, Mn, Cr and V and Q is a chalcogen such as O or S. Among these, it is preferred to use a Lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive (E) for a Lithium-ion secondary battery, the compound (EA) may comprise a lithiated or partially lithiated transition metal oxyanion-based electro-active material of formula $M_1M_2(JO_4)_fE_{1-f}$, wherein $M_1$ is Lithium, which may be partially substituted by another alkali metal representing less than 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (EA) has formula $Li_{3-x}M'_yM''_{2-y}(JO_4)_3$ wherein $0 \leq x \leq 3$, $0 \leq y \leq 2$, M' and M" are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein $0 \leq x \leq 1$, wherein x is preferably 1 (that is to say, Lithium iron phosphate of formula $LiFePO_4$).

In the case of forming a negative electrode (E) for a Lithium-ion secondary battery, the compound (EA) may preferably comprise:
graphitic carbons able to intercalate Lithium, typically existing in forms such as powders, flakes, fibers or spheres (for example, mesocarbon microbeads) hosting Lithium;
Lithium metal;
Lithium alloy compositions, including notably those described in U.S. Pat. No. 6,203,944 (3M INNOVATIVE PROPERTIES CO.) 20 Mar. 2001 and/or in WO 00/03444 (MINNESOTA MINING AND MANUFACTURING CO.) 20 Jan. 2000;
Lithium titanates, generally represented by formula $Li_4Ti_5O_{12}$; these compounds are generally considered as "zero-strain" insertion materials, having low level of physical expansion upon taking up the mobile ions, i.e. $Li^+$;
Lithium-silicon alloys, generally known as Lithium silicides with high Li/Si ratios, in particular Lithium silicides of formula $Li_{4.4}Si$;
Lithium-germanium alloys, including crystalline phases of formula $Li_{4.4}Ge$.

For the purpose of the present invention, the term "liquid medium [medium (L)]" is intended to denote a medium comprising one or more substances in the liquid state at 20° C. under atmospheric pressure.

The medium (L) in the membrane of the invention may be equal to or different from the medium (L) in any of the positive electrode (E) and the negative electrode (E) of the electrochemical device of the invention.

The medium (L) is typically free from one or more solvents (S).

The medium (L) in the membrane of the invention typically comprises at least one organic carbonate in an amount of at least 30% by weight, preferably of at least 50% by weight, more preferably of at least 75% by weight, based on the total weight of the medium (L).

The medium (L) in the membrane of the invention may further comprise one or more additives.

The medium (L) in the membrane of the invention typically comprises, more preferably consists of, at least one organic carbonate, $LiPF_6$ and, optionally, one or more additives.

Should the medium (L) in the membrane of the invention further comprise one or more additives, one or more additives are typically present in said medium (L) in an amount of at most 70% by weight, preferably of at most 50% by weight, more preferably of at most 25% by weight, based on the total weight of the medium (L).

The amount of the medium (L) in the membrane of the invention is typically at least 40% by weight, preferably at least 50% by weight, more preferably at least 60% by weight, based on the total weight of said medium (L) and the at least one polymer (F-h).

The medium (L) in any of the positive electrode (E) and the negative electrode (E) of the electrochemical device of the invention preferably comprises at least one organic carbonate and $LiPF_6$.

The medium (L) in any of the positive electrode (E) and the negative electrode (E) of the electrochemical device of the invention typically comprises at least one organic carbonate in an amount of at least 30% by weight, preferably of at least 50% by weight, more preferably of at least 75% by weight, based on the total weight of the medium (L).

The medium (L) in any of the positive electrode (E) and the negative electrode (E) of the electrochemical device of the invention may further comprise one or more additives.

The medium (L) in any of the positive electrode (E) and the negative electrode (E) of the electrochemical device of the invention typically comprises, more preferably consists of, at least one organic carbonate, $LiPF_6$ and, optionally, one or more additives.

Should the medium (L) in any of the positive electrode (E) and the negative electrode (E) of the electrochemical device of the invention further comprise one or more additives, one or more additives are typically present in said medium (L) in an amount of at most 70% by weight, preferably of at most 50% by weight, more preferably of at most 25% by weight, based on the total weight of the medium (L).

The amount of the medium (L) in any of the positive electrode (E) and the negative electrode (E) of the electrochemical device of the invention is typically at least 40% by weight, preferably at least 50% by weight, more preferably at least 60% by weight, based on the total weight of said medium (L) and the at least one polymer (F).

Non-limiting examples of organic carbonates suitable for use in the medium (L) include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

Non-limiting examples of additives suitable for use in the medium (L) include, notably, ionic liquids.

For the purpose of the present invention, the term "ionic liquid" is intended to denote a compound formed by the combination of a positively charged cation and a negatively charged anion in the liquid state at temperatures below 100° C. under atmospheric pressure.

The salt (M) is typically selected from the group consisting of:
(a) MeI, $Me(PF_6)_n$, $Me(BF_4)_n$, $Me(ClO_4)_n$, Me(bis(oxalato)borate)$_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$, wherein $R_F$ is $C_2F_5$, $C_4F_9$ or $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2,
(b)

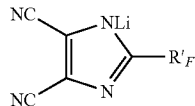

wherein $R'_F$ is selected from the group consisting of F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_3F_5OCF_3$, $C_2F_4OCF_3$, $C_2H_2F_2OCF_3$ and $CF_2OCF_3$, and
(c) combinations thereof.

The concentration of $LiPF_6$ in the medium (L) of the membrane of the invention is advantageously at least 0.01 M, preferably at least 0.025 M, more preferably at least 0.05 M.

The concentration of $LiPF_6$ in the medium (L) of the membrane of the invention is advantageously at most 3 M, preferably at most 2 M, more preferably at most 1 M.

The concentration of the salt (M) in the medium (L) of any of the positive electrode (E) and the negative electrode (E) of the electrochemical device of the invention is advantageously at least 0.01 M, preferably at least 0.025 M, more preferably at least 0.05 M.

The concentration of the salt (M) in the medium (L) of any of the positive electrode (E) and the negative electrode (E) of the electrochemical device of the invention is advantageously at most 3 M, preferably at most 2 M, more preferably at most 1 M.

For the purpose of the present invention, the term "conductive compound [compound (C)]" is intended to denote a compound able to impart electron conductivity to the electrode.

The compound (C) is typically selected from the group consisting of carbonaceous materials such as carbon black, carbon nanotubes, graphite powder, graphite fiber and metal powders or fibers such as nickel and aluminium powders or fibers.

Any of the positive electrode (E) and the negative electrode (E) of the electrochemical device of the invention may further comprise one or more additives such as vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, alkyl phosponates, and vinyl-containing silane-based compounds.

Any of the positive electrode (E) and the negative electrode (E) is preferably a flexible electrode (E), wherein the current collector comprises, preferably consists of, a polymer substrate and, adhered to said polymer substrate, an electrically conductive layer.

The flexible electrode (E) advantageously ensures both outstanding mechanical flexibility and outstanding electrochemical performances of the electrochemical device thereby provided.

The polymer substrate of the current collector of the flexible electrode (E) of the invention typically comprises, preferably consists of, at least one semi-crystalline polymer.

For the purpose of the present invention, the term "semi-crystalline" is intended to denote a polymer having a heat of fusion of from 10 to 90 J/g, preferably of from 30 to 60 J/g, more preferably of from 35 to 55 J/g, as measured according to ASTM D3418-08.

The polymer substrate of the current collector of the flexible electrode (E) of the invention preferably comprises, more preferably consists of, at least one semi-crystalline polymer having a melting point higher than 130° C., preferably higher than 150° C., more preferably higher than 200° C.

The polymer substrate of the current collector of the flexible electrode (E) of the invention more preferably comprises, even more preferably consists of, at least one semi-crystalline polymer selected from the group consisting of halopolymers such as polyvinylidene chloride, fluoropolymers, polyesters, polyolefins such as polypropylenes, polyamides such as aromatic polyamides and polycarbonates.

Non-limiting examples of suitable fluoropolymers include partially fluorinated fluoropolymers comprising recurring units derived from at least one hydrogen-containing fluorinated monomer such as vinylidene fluoride (VDF) or at least one per(halo)fluorinated monomer such as chlorotrifluoroethylene (CTFE) and/or tetrafluoroethylene (TFE).

The polymer substrate of the current collector of the flexible electrode (E) of the invention more preferably comprises, even more preferably consists of, at least one partially fluorinated fluoropolymer comprising recurring units derived from:
  at least one per(halo)fluorinated monomer selected from the group consisting of tetrafluoroethylene (TFE) and chlorotrifluoroethylene (CTFE),
  at least one hydrogenated monomer selected from ethylene, propylene and isobutylene, and
  optionally, one or more additional monomers, typically in amounts of from 0.1% to 30% by moles, based on the total amount of TFE and/or CTFE and said hydrogenated monomer(s).

The polymer substrate of the current collector of the flexible electrode (E) of the invention even more preferably comprises, still more preferably consists of, at least one partially fluorinated fluoropolymer comprising:
  from 35% to 65%, preferably from 45% to 55% by moles of ethylene (E),
  from 65% to 35%, preferably from 55% to 45% by moles of at least one of chlorotrifluoroethylene (CTFE) and tetrafluoroethylene (TFE) or a mixture thereof, and
  optionally, from 0.1% to 30% by moles, based on the total amount of TFE and/or CTFE and ethylene, of one or more additional monomers.

The electrically conductive layer of the current collector of the flexible electrode (E) of the invention typically comprises, preferably consists of, Carbon (C) or Silicon (Si) or at least one metal selected from the group consisting of Lithium (Li), Sodium (Na), Zinc (Zn), Magnesium (Mg), Copper (Cu), Aluminium (Al), Nickel (Ni), Titanium (Ti) and alloys thereof including, but not limited to, stainless steel.

The electrically conductive layer of the current collector of the flexible electrode (E) of the invention is typically in the form of a foil, mesh or net.

The electrically conductive layer of the current collector of the flexible electrode (E) of the invention typically has a thickness comprised between 0.1 µm and 100 µm, preferably between 2 µm and 50 µm, more preferably between 5 µm and 20 µm.

The fluoropolymer layer of the flexible electrode (E) of the invention typically has a thickness comprised between 10 µm and 500 µm, preferably between 50 µm and 250 µm, more preferably between 70 µm and 150 µm.

The nature of the current collector of the electrode (E) of the invention depends on whether the electrode (E) thereby provided is a positive electrode (E) or a negative electrode (E).

Should the electrode (E) of the invention be a positive electrode (E), the current collector typically comprises, preferably consists of, Carbon (C) or at least one metal selected from the group consisting of Aluminium (Al), Nickel (Ni), Titanium (Ti) and alloys thereof.

Should the electrode (E) of the invention be a positive electrode (E), the current collector preferably consists of Aluminium (Al).

Should the electrode (E) of the invention be a negative electrode (E), the current collector typically comprises, preferably consists of, Carbon (C) or Silicon (Si) or at least one metal selected from the group consisting of Lithium (Li), Sodium (Na), Zinc (Zn), Magnesium (Mg), Copper (Cu) and alloys thereof.

Should the electrode (E) of the invention be a negative electrode (E), the current collector preferably consists of Copper (Cu).

The flexible electrode (E) is typically obtainable by a process comprising:
(i) providing a current collector comprising, preferably consisting of, a polymer substrate and, adhered to said polymer substrate, an electrically conductive layer,
(ii) providing an electrode-forming composition comprising, preferably consisting of:
  at least one fluoropolymer [polymer (F)],
  at least one electro-active compound [compound (EA)],
  a liquid medium [medium (L)],
  at least one organic solvent [solvent (S)] different from said medium (L),
  optionally, at least one metal salt [salt (M)],
  optionally, at least one conductive compound [compound (C)], and
  optionally, one or more additives,
(iii) applying the electrode-forming composition provided in step (ii) onto the electrically conductive layer of the current collector provided in step (i) thereby providing an electrode [electrode (E)], and
(iv) evaporating said at least one solvent (S) from the electrode (E) provided in step (iii).

The choice of the solvent (S) is not particularly limited provided that it is suitable for solubilising the polymer (F).

The solvent (S) is typically selected from the group consisting of:
  alcohols such as methyl alcohol, ethyl alcohol and diacetone alcohol,
  ketones such as acetone, methylethylketone, methylisobutyl ketone, diisobutylketone, cyclohexanone and isophorone,
  linear or cyclic esters such as isopropyl acetate, n-butyl acetate, methyl acetoacetate, dimethyl phthalate and γ-butyrolactone,
  linear or cyclic amides such as N,N-diethylacetamide, N,N-dimethylacetamide, dimethylformamide and N-methyl-2-pyrrolidone, and
  dimethyl sulfoxide.

The current collector provided in step (i) of the process of the invention is typically manufactured by applying an electrically conductive layer onto a polymer substrate, preferably by any suitable procedures such as lamination, preferably co-lamination, typically using a double side adhesive tape, hot embossing, coating, printing, plating using vacuum techniques such as physical vapor deposition, chemical vapor deposition and direct evaporation.

Under step (iii) of the process of the invention, the electrode-forming composition is applied onto the electrically conductive layer of the current collector typically by any suitable procedures such as casting, printing and roll coating.

Optionally, step (iii) may be repeated, typically one or more times, by applying the electrode-forming composition provided in step (iii) onto the electrode (E) provided in step (iv).

Under step (iv) of the process of the invention, drying may be performed either under atmospheric pressure or under vacuum. Alternatively, drying may be performed under modified atmosphere, e.g. under an inert gas, typically exempt notably from moisture (water vapor content of less than 0.001% v/v).

The drying temperature will be selected so as to effect removal by evaporation of one or more solvents (S) from the electrode (E) of the invention.

The electrode (E) of the invention is preferably free from one or more solvents (S).

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-A): VDF-AA (0.9% by moles)-HFP (2.4% by mole) polymer having an intrinsic viscosity of 0.30 l/g in DMF at 25° C.

Polymer (F-B): VDF-HEA (0.8% by moles)-HFP (2.4% by mole) polymer having an intrinsic viscosity of 0.08 l/g in DMF at 25° C.

$LiPF_6$: Lithium hexafluorophosphate salt.

NMC: $LiNi_{0.33}Mn_{0.33}Co_{0.33}O_2$, commercially available from Umicore.

Liquid medium (L-A): solution of $LiPF_6$ (1 mol/L) in ethylene carbonate (EC)/propylene carbonate (PC) (1/1 by volume) comprising vinylene carbonate (VC) (2% by weight).

Graphite: 75% SMG HE2-20 (Hitachi Chemical Co., Ltd.)/25% TIMREX® SFG 6.

DBTDL: dibutyl tin dilaurate.

TEOS: tetraethoxysilane.

TSPI: 3-(triethoxysilyl)propyl isocyanate.

Determination of Intrinsic Viscosity of Polymer (F)

Intrinsic viscosity (η) [dl/g] was measured using the following equation on the basis of dropping time, at 25° C., of a solution obtained by dissolving the polymer (F) in N,N-dimethylformamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r$−1, and $\Gamma$ is an experimental factor, which for polymer (F) corresponds to 3.

General Procedure for the Manufacture of Electrodes Using the Liquid Medium (L-A)

A solution of polymer (F-A) in acetone was prepared at 60° C. and then brought to room temperature in an Argon glove box ($O_2$<2 ppm, $H_2O$<2 ppm).

In the next step, the liquid medium (L-A) was added to the solution so obtained.

The weight ratio $[m_{medium\ (L-A)}/(m_{medium\ (L-A)} + m_{polymer\ (F-A)})] \times 100$ was 75%.

Anode:

Graphite was added to the solution so obtained in a weight ratio of 90/10 (graphite/polymer (F-A)).

Cathode:

A composition comprising a blend of 50% by weight of C-NERGY® SUPER C65 carbon black and 50% by weight of VGCF® carbon fiber (CF) and NMC was added to the solution so obtained in a weight ratio of 90/10 ((CF+NMC)/polymer (F-A)). The CF/NMC weight ratio was 7.8/92.2.

Casting Procedure

The solution mixture was spread with a constant thickness onto a metal collector using a tape casting machine (doctor blade) in a dry room (dew point: −40° C.). The thickness was controlled by the distance between the knife and the metal collector. The thickness of the wet layer of the anode so obtained was about 325 μm. The thickness of the wet layer of the cathode so obtained was about 650 μm.

The viscosity of the mixture was tuned by adding acetone. The solvent was then evaporated from said mixture thereby providing the electrode.

General Procedure for the Manufacture of Membranes Using the Liquid Medium (L-A)

The polymer (F-B) (1.5 g) was dissolved in 8.5 g of acetone at 60° C. thereby providing a solution containing 15% by weight of said polymer (F-B). The solution was homogeneous and transparent after homogenization at room temperature. DBTDL (0.015 g) was then added. The solution was homogenized at 60° C. TSPI (0.060 g) was added thereto. The quantity of DBTDL was calculated to be 10% by moles vs. TSPI. TSPI itself was calculated to be 1.1% by mole vs. the polymer (F-B). The solution was kept at 60° C. for about 90 min so as to let isocyanate functional groups of TSPI to react with the hydroxyl groups of the polymer (F-B).

In the next step, the liquid medium (L-A) was added to the solution so obtained.

The weight ratio $[m_{medium\ (L-A)}/(m_{medium\ (L-A)} + m_{polymer\ (F-B)})]$ was 80%.

After homogenization at 60° C., formic acid was added. TEOS was then added thereto. The quantity of TEOS was calculated from the weight ratio ($m_{SiO2}/m_{polymer\ (F-B)}$) assuming total conversion of TEOS into $SiO_2$. This ratio was 10%.

The quantity of formic acid was calculated from the following equation:

$$n_{formic\ acid}/n_{TEOS} = 7.8.$$

All the ingredients were fed to the solution mixture so obtained under Argon atmosphere. The solution mixture was spread with a constant thickness onto a PET substrate using a tape casting machine (doctor blade) in a dry room (dew point: −40° C.). The thickness was controlled by the distance between the knife and the PET film.

The solvent was quickly evaporated from the solution mixture and the membrane was obtained. After a few hours, the membrane was detached from the PET substrate. The membrane so obtained had a constant thickness of 32 μm.

Manufacture of a Lithium-Ion Battery

A coin cell was prepared by placing the membrane prepared according to the general procedure as detailed above between the cathode (2.4 mAh/$cm^2$) and the anode (2.8 mAh/$cm^2$) prepared according to the general procedure as detailed above.

The coin cell was cycled between 2.8 V and 4.15 V.

After a step of 2 cycles at C/20-D/20, the test protocol was carried out according to successive series of 5 cycles at C/10-D/10, C/5-D/5, C/2-D/2, C/2-D, C/2-2D.

The discharge capacity values of the coin cell so obtained under different discharge rates are set forth in Table 1 here below.

TABLE 1

| Rate | | Average Discharge Capacity [mAh/g] | [%] |
|---|---|---|---|
| 0.05 | Discharge D/20 | 132 | 100 |
| 0.1 | Discharge D/10 | 128 | 97 |
| 0.2 | Discharge D/5 | 124 | 94 |
| 0.5 | Discharge D/2 | 114 | 87 |
| 1 | Discharge D | 109 | 83 |
| 2 | Discharge 2D | 69 | 53 |
| 0.05 | Discharge D/20 | 126 | 96 |

It has been found that the secondary battery of the invention advantageously complies with safety requirements. Also, it has been surprisingly found that no degradation of $LiPF_6$ has occurred in the secondary battery of the invention, which successfully maintained outstanding discharge capacity values at high discharge rates.

The invention claimed is:

1. An electrochemical device comprising at least one membrane between a positive electrode (E) and a negative electrode (E), said membrane comprising:
   at least one polymer (F-h), wherein polymer (F-h) is a fluoropolymer hybrid organic/inorganic composite, and
   a liquid medium (L) comprising at least one organic carbonate and $LiPF_6$, and
wherein at least one of the positive electrode (E) and the negative electrode (E) comprises:
   a current collector, and
   adhered to said current collector, at least one fluoropolymer layer comprising:
   at least one polymer (F), wherein polymer (F) is a fluoropolymer,
   at least one electro-active compound (EA),
   a liquid medium (L) comprising at least one metal salt (M),
   optionally, at least one conductive compound (C), and
   optionally, one or more additives.

2. The electrochemical device according to claim 1, wherein polymer (F) of any of the positive electrode (E) and the negative electrode (E) is a functional polymer (F) comprising recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

3. The electrochemical device according to claim 2, wherein the functional hydrogenated monomer comprising at least one carboxylic acid end group of the functional polymer (F) is of formula (V):

(V)

wherein each of $R_1$, $R_2$ and $R_3$, equal to or different from each other, is independently a hydrogen atom or a $C_1$-$C_3$ hydrocarbon group.

4. The electrochemical device according to claim 1, wherein medium (L) in any of the positive electrode (E) and the negative electrode (E) comprises, at least one organic carbonate, $LiPF_6$ and, optionally, one or more additives.

* * * * *